(12) United States Patent  
Prakash et al.

(10) Patent No.: US 8,136,721 B2
(45) Date of Patent: Mar. 20, 2012

(54) ENHANCED CHECK CODE LINE IMAGE CAPTURE FOR IMPROVED OCR

(75) Inventors: Ravinder Prakash, Concord, NC (US); Jeffrey E. Journey, Concord, NC (US); Clair F. Rohe, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 11/383,072

(22) Filed: May 12, 2006

(65) Prior Publication Data

US 2007/0262146 A1    Nov. 15, 2007

(51) Int. Cl.
  *G06Q 40/00* (2006.01)
  *G07D 11/00* (2006.01)
  *G07F 19/00* (2006.01)

(52) U.S. Cl. ........ 235/379; 235/454; 235/487; 235/494; 382/137; 382/139; 382/140; 705/35; 705/43; 705/45

(58) Field of Classification Search .................. 235/379, 235/454, 487, 494; 382/137, 139, 140; 705/35, 705/43, 45
See application file for complete search history.

(56) References Cited

U.S. PATENT DOCUMENTS

| | | | | |
|---|---|---|---|---|
| 4,408,342 A | * | 10/1983 | Grabowski et al. | 382/140 |
| 4,685,141 A | | 8/1987 | Hoque et al. | |
| 4,888,812 A | * | 12/1989 | Dinan et al. | 382/140 |
| 5,134,663 A | * | 7/1992 | Kozlowski | 382/139 |
| 5,504,822 A | | 4/1996 | Holt | |
| 5,544,043 A | * | 8/1996 | Miki et al. | 705/45 |
| 5,631,974 A | * | 5/1997 | Lau-Kee et al. | 382/132 |
| 5,864,629 A | | 1/1999 | Wustmann | |
| 5,940,844 A | * | 8/1999 | Cahill et al. | 715/268 |
| 6,473,519 B1 | | 10/2002 | Pidhirny et al. | |
| 2002/0180812 A1 | * | 12/2002 | Kim et al. | 345/856 |
| 2003/0189099 A1 | * | 10/2003 | Carlson et al. | 235/454 |
| 2004/0001623 A1 | * | 1/2004 | Ugolin et al. | 382/170 |
| 2004/0076320 A1 | * | 4/2004 | Downs, Jr. | 382/139 |
| 2004/0217170 A1 | * | 11/2004 | Takiguchi et al. | 235/449 |
| 2005/0213815 A1 | | 9/2005 | Garoutte | |
| 2005/0230480 A1 | | 10/2005 | Kolstad et al. | |
| 2005/0236485 A1 | | 10/2005 | Wang et al. | |
| 2006/0144937 A1 | * | 7/2006 | Heilper et al. | 235/383 |
| 2007/0041629 A1 | * | 2/2007 | Prakash et al. | 382/139 |
| 2007/0065008 A1 | * | 3/2007 | Kao et al. | 382/169 |

OTHER PUBLICATIONS

Author unknown, "Allmypapers MICR OCR Solutions," http://www.allmypapers.com/solutions_1.htm, printed on May 9, 2006.

* cited by examiner

*Primary Examiner* — Ali Sharifzada
(74) *Attorney, Agent, or Firm* — Douglas A. Lashmit; Hoffman Warnick LLC

(57) ABSTRACT

A method for enhancing a check code line image of a captured document such as a bank check. The method includes capturing an electronic image of a document; locating a code line region within the electronic image of the document; and performing a localized video gain on the code line region.

10 Claims, 2 Drawing Sheets

ENHANCED CHECK CODE LINE IMAGE CAPTURE FOR IMPROVED OCR

FIELD OF THE INVENTION

The invention relates generally to character recognition systems, and more particularly, to a system and method for enhancing check code line images for improving optical character recognition.

BACKGROUND OF THE INVENTION

With the passage of the Check 21 Act ("Check21"), financial institutions are now able to conduct check transactions based on electronic images of the check. Accordingly, the need for optical character recognition (OCR) of the check code line has taken on renewed importance. Before Check21, the code line character data was primarily read with MICR (magnetic ink character recognition) signals by using either multi-gap or single gap read systems. Because MICR utilizes magnetic, as opposed to optical, information to read character data, MICR readers are generally immune to optical noise, such as signature descenders, memo line descenders, check background, etc. Any optical noise found on a check is typically due to non-magnetic ink and thus does not distract MICR readers. However, using OCR technology to read the same information poses a more difficult situation.

At least two types of technical concerns are raised that potentially introduce optical noise into the code line data. First, the check code line region, which should ideally comprise a clear band with MICR characters printed thereon, is typically not an optically clear band. Instead, the code line region often contains different forms of safety background and/or scenes preprinted on the check that cover that region. Second, user-entered text (descenders) originating from the signature and/or memo line often ends up in the clear band. Both of these types of optical noise introduce issues with the code line OCR. In the process of converting the check image to black-white, some of this optical noise may survive as dark printed strokes, making OCR less reliable than that which is required.

Accordingly, a need exists for a system and method that will enhance OCR performance by addressing the problems associated with the introduction of optical noise into the check code line region.

SUMMARY OF THE INVENTION

The present invention addresses the above-mentioned problems, as well as others, by providing a system for reducing optical noise in a code line region of a scanned document. In a first aspect, the invention provides an image processing system for enhancing a code line in a captured document, comprising: an image capture system for capturing an electronic image of a document; a code line locator system for locating a code line region within the electronic image of the document; and a blooming system for performing a localized video gain on the code line region.

In a second aspect, the invention provides a method for enhancing a code line in a captured document, comprising: capturing an electronic image of a document; locating a code line region within the electronic image of the document; and performing a localized video gain on the code line region.

In a third aspect, the invention provides a computer program product stored on a computer usable medium for enhancing a code line in a captured document, comprising: program code configured for converting a gray scale image of a document to a black-white image of the document; program code configured for locating a code line region within the document; and program code configured for performing a localized video gain on the code line region.

In a fourth aspect, the invention provides a method for deploying an application for enhancing a code line in a captured document, comprising: providing a computer infrastructure being operable to: convert a gray scale image of a document to a black-white image of the document; locate a code line region within the document; and perform a localized video gain on the code line region.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
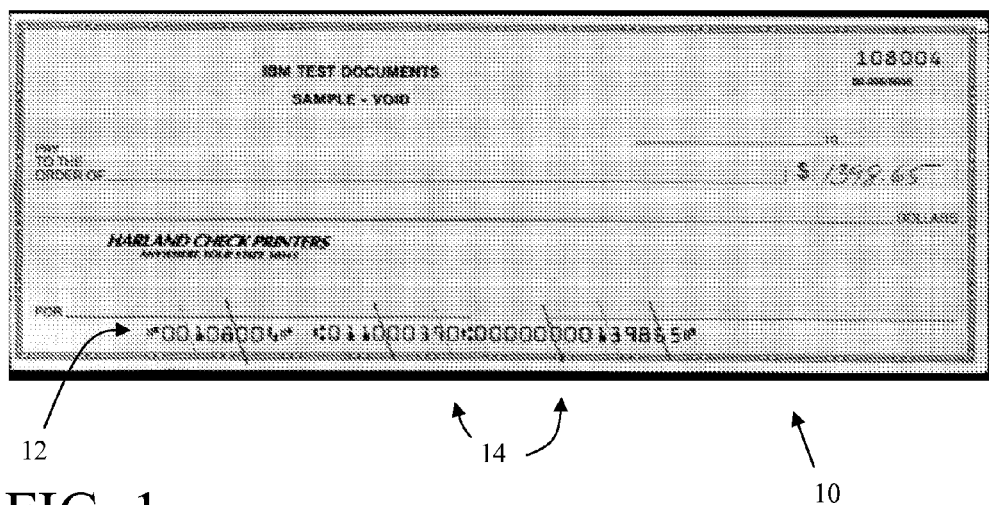
FIG. 1 depicts a captured check image with optical noise in the check code line in accordance with an embodiment of the present invention.

Referring now to the drawings, FIG. 1 depicts an illustrative gray scale check image 10 as captured by a digital camera, such as a charge couple device (CCD) camera or equivalent device. As noted above, due to optical noise, issues may arise when performing optical character recognition (OCR) of the check code line 12. According to banking standards, the code line 12 is printed using E13B characters in a pre-designated region of the check, namely the bottom ⅝ of an inch. Thus, the account number, routing information, etc., can be readily obtained from the check. However, signature or memo line descenders created by the user, as well as background designs, can create optical noise that can interfere with the OCR operations when attempting to read the code line 12. For illustrative purposes, FIG. 1 depicts several diagonal lines 14 that were drawn in the code line region 12 to create optical interference with the code line data. In this example, different print densities were achieved using different color pens.

In most check processing systems, checks are transported in the direction parallel to the code line 12. A linear CCD camera used to capture the image has pixels perpendicular to the transport direction. Once collected, the image data is stored in a raw image buffer. In a typical scenario, a camera calibration is utilized as part of the image capture process to automatically set the gain (brightness) and video bias of the image. Namely, a gain and video bias are established for each CCD pixel.

Figure 2:
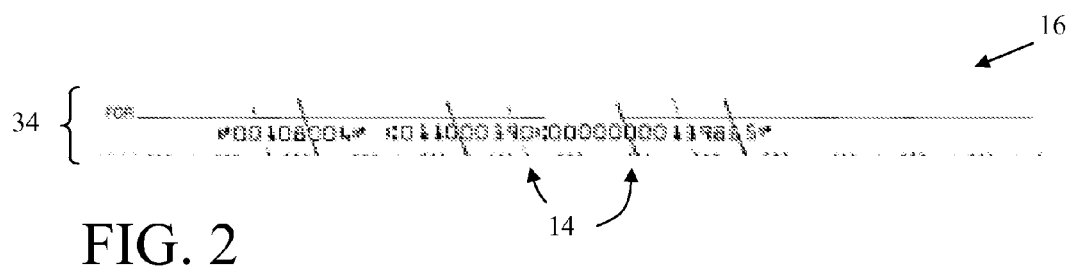
FIG. 2 depicts a black-white image of the code line region of the captured check image of FIG. 1.

FIG. 2 depicts the code line region 34 of the check image 10 of FIG. 1 after the image has been converted to a black-white image 16, which is the typical process used by the banking industry. As can be seen, the optical noise 14 is still present after the conversion.

Figure 3:
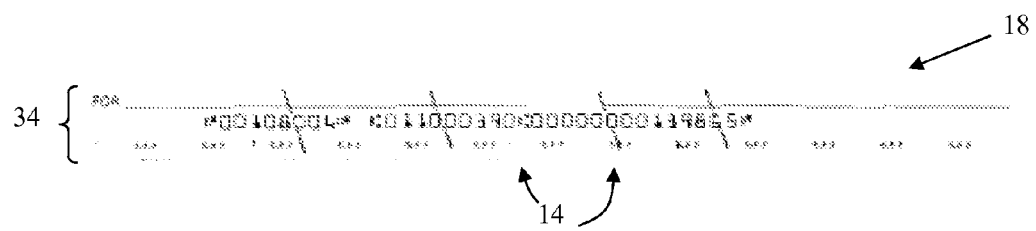
FIG. 3 depicts a black-white image of the code line region of the captured check image of FIG. 1 enhanced in accordance with an embodiment of the present invention.

The present invention reduces the optical noise 14 in the code line region 34 by selectively increasing the gain of just the code line region 34 of the check to create a "blooming" effect in that region. An example of this is shown in the black-white image 18 in FIG. 3, in which the code line region 34 has been saturated to cause a blooming effect. (The remainder of the check image would be processed in a normal manner.) In an illustrative embodiment, the video gain for the code line region 34 may be increased by, e.g., 25%, thereby increasing the contrast between the optical noise and MICR characters in the code line region 34. Any optical noise, whether introduced by human writing or inherently present in the check will be bloomed causing the noise to less likely appear as black in the black-white image 18. Note that the actual amount of video gain may vary depending upon the application, and the example provided above is for illustrative purposes only. As can be seen, the OCR machine readability of the code line region 34 of FIG. 3 is improved relative to the code line region 34 of FIG. 2 due to a reduction and/or absence of the interference by the diagonal lines 14. Note that the printed MICR characters in the code line 12 are printed very black and thus do not get impacted by the video gain.

Figure 4:
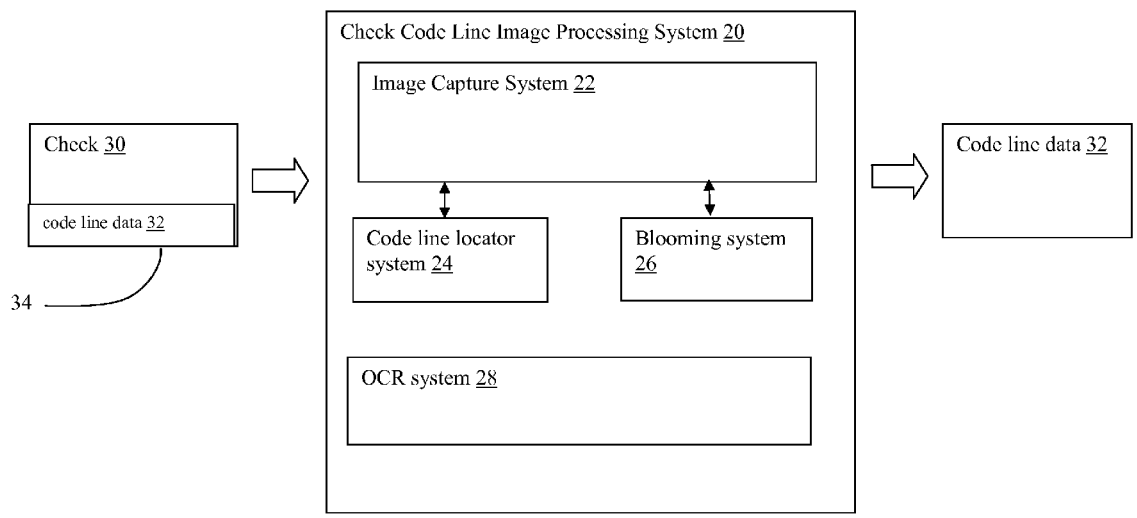
FIG. 4 depicts a check code line image processing system in accordance with an embodiment of the present invention.

Referring now to FIG. 4, a check code line image processing system 20 for obtaining code line data 32 from a code line region 34 of check 30 is shown. Check code line image processing system 20 includes an image capture system 22, a code line locator system 24, a blooming system 26, and an OCR system 28. Image capture system 22 may comprise any system or device for scanning a document (e.g., check 30) to capture electronic data. Typical image capture systems 22 may comprise a CCD camera, a bi-tonal conversion system for converting from gray scale to black-white, related hardware and software, processing, storage, etc. As noted above, image data is first captured as a gray scale image and is then converted to a black-white image. In addition, a calibration system is typically utilized to automatically set the gain and bias of the camera for the image being scanned.

Code line locator system 24 provides a system for locating and selecting the code line region 34 containing the code line data 32 in the inputted document. In the case of a check 30, it is known the code line data 32 resides at the bottom ⅝ inch of the check document. Accordingly, for the case of a check 30, code line locator system 24 may simply select the bottom ⅝ inch as the code line region 34. In other applications, code line locator system 24 could include a facility for searching the document for code line data 32 based on some other criteria, e.g., it may search for E13B characters, characters of a certain size or font, a watermark, etc.

Blooming system 26 performs a localized blooming operation on the code line region 34 by increasing the video gain on the code line region 34, while processing the remainder of the check 30 in a normal fashion. The result is a localized video gain of the region 34 containing the code line data 32, which increases the contrast between the optical noise and the code line data 32, and causes no damaging side effects to the code line data 32. As noted, an illustrative code line saturated in accordance with this technique is shown in FIG. 3. Note that blooming system 26 and/or code line locator system 24 could be integrated into image capture system 22, or be implemented as separate components. Note that blooming system 26 may also adjust the video bias if necessary to further enhance the blooming operation.

Once the blooming system 26 enhances the code line region 34 of the check 30 as described above, the code line data 32 can be read more effectively by OCR system 28. In particular, as shown in FIG. 3, the optical noise created by diagonal lines 14 is greatly reduced, making the likelihood of a misread or error by OCR system 28 significantly less.

Given the fact that banks are exchanging black-white images and that the industry allows for checks that do not necessarily comply with the standards, namely that the clear band be "clear," this technique offers a simple solution to a large problem. Furthermore, even the simplest bi-tonal conversion system, i.e., conversion of a gray scale image to a black-white image, typically includes much of the underlying functionality necessary to implement localized video gain.

Note that while the illustrative embodiments described herein are generally directed to a system for reading code line data from a check, the invention could be applied to any application in which optical noise can be reduced on a portion of an imaged document using localized video saturation.

In general, check code line image processing system 20 may be implemented using any type of hardware and/or computing system. Such a computer system generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the system and likewise may comprise any known type of transmission link, including electrical, optical, wireless, etc. Additional components, such as cache memory, communication systems, system software, etc., may be utilized.

Access to check code line image processing system 20 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a check code line image processing system 20 comprising a system for performing localized video gain could be created, maintained and/or deployed by a service provider that offers the functions described herein for customers. That is, a service provider could offer to provide code line enhancements as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for enhancing a code line in a captured document, comprising:
   capturing an electronic image of a document comprising a check containing a code line region wherein the electronic image is captured as a gray scale image;
   locating the code line region within the electronic image of the document;
   performing a localized video gain on the code line region of the gray scale image to create a blooming effect thereby increasing contrast between optical noise and code line data on the code line region; and
   converting the gray scale image to a black-white image.

2. The method of claim 1, wherein the code line includes account data.

3. The method of claim 1, wherein the capturing step uses a digital camera.

4. The method of claim 1, wherein the code line region is located at a bottom portion of the check.

5. The method of claim 1, comprising a further step of reading code line data from the code line region with an optical character recognition system.

6. A method for deploying an application for enhancing a code line in a captured document, comprising:
   providing a computer infrastructure being operable to:
     capture a gray scale image of a document comprising a check containing a code line region;
     locate the code line region within the document;
     perform a localized video gain on the code line region of the gray scale image to create a blooming effect thereby increasing contrast between optical noise and code line data on the code line region; and
     convert the gray scale image to a black-white image.

7. An image processing system for enhancing a code line in a captured document, comprising:
   an image capture system for capturing an electronic image of a document comprising a check containing a code line region wherein the electronic image is captured as a gray scale image;
   a code line locator system for locating the code line region within the electronic image of the document;
   a blooming system for performing a localized video gain on the code line region of the gray scale image thereby increasing contrast between optical noise and code line data on the code line region; and
   converting the gray scale image to a black-white image.

8. The image processing system of claim 7, wherein the code line includes account information.

9. The image processing system of claim 7, wherein the image capture system comprises a digital camera.

10. The image processing system of claim 7, wherein the code line region is located at a bottom portion of the check.

* * * * *